US008477795B2

(12) United States Patent
Kini et al.

(10) Patent No.: US 8,477,795 B2
(45) Date of Patent: Jul. 2, 2013

(54) LDP IGP SYNCHRONIZATION FOR BROADCAST NETWORKS

(75) Inventors: Sriganesh Kini, Fremont, CA (US); Wenhu Lu, San Jose, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 980 days.

(21) Appl. No.: 12/546,433

(22) Filed: Aug. 24, 2009

(65) Prior Publication Data

US 2011/0044348 A1    Feb. 24, 2011

(51) Int. Cl.
*H04L 12/56* (2006.01)
*H04L 29/02* (2006.01)

(52) U.S. Cl.
USPC .................. 370/401; 370/216; 370/238

(58) Field of Classification Search
None
See application file for complete search history.

(56) References Cited

U.S. PATENT DOCUMENTS

| | | | |
|---|---|---|---|
| 6,778,531 | B1 | 8/2004 | Kodialam et al. |
| 7,042,850 | B2 | 5/2006 | Stewart |
| 7,437,476 | B2 | 10/2008 | Zinin et al. |
| 7,551,551 | B2 | 6/2009 | Filsfils et al. |
| 7,551,599 | B2 | 6/2009 | Levit et al. |
| 2002/0078232 | A1 | 6/2002 | Simpson et al. |
| 2003/0185217 | A1 | 10/2003 | Ganti et al. |
| 2004/0202171 | A1 | 10/2004 | Hama |
| 2005/0088965 | A1 | 4/2005 | Atlas et al. |
| 2006/0126496 | A1 | 6/2006 | Filsfils et al. |
| 2007/0019647 | A1 | 1/2007 | Roy et al. |
| 2007/0165515 | A1 | 7/2007 | Vasseur |
| 2007/0180104 | A1 | 8/2007 | Filsfils et al. |
| 2007/0245034 | A1 | 10/2007 | Retana et al. |
| 2007/0268821 | A1 | 11/2007 | Levit et al. |
| 2008/0101418 | A1 | 5/2008 | Vasseur |
| 2008/0320166 | A1 | 12/2008 | Filsfils et al. |
| 2009/0245259 | A1 | 10/2009 | Filsfils et al. |

OTHER PUBLICATIONS

Notice of Allowance, U.S. Appl. No. 12/421,443, dated May 18, 2011, 10 pages.
International Search Report and Written Opinion, Application No. PCT/IB2010/053807, dated Dec. 10, 2010, 14 pages.
Ayyangar, V., et al., LDP OSPF Synchronization and VPN Traffic Blackholing, Network Working Group, Internet Draft, Jan. 2007, 11 pages.
Chen, Emily, Explicit Notification for LDP-IGP Synchronization, Network Working Group, Internet Draft, Jun. 2007, 11 pages.
McPherson, D., Intermediate System (IS-IS) Transient Blackhole Avoidance, Network Working Group, RFC 3277, Apr. 2002, 7 pages.

(Continued)

*Primary Examiner* — Marsha D Banks Harold
*Assistant Examiner* — Matthew Campbell
(74) *Attorney, Agent, or Firm* — Blakely, Sokoloff, Taylor & Zafman LLP

(57) ABSTRACT

A method and apparatus for LDP-IGP synchronization for broadcast networks. In one embodiment of the invention, responsive to a network element bringing up an adjacency with a Designated Router of the broadcast network on a broadcast interface, that network element advertises in its Link State Advertisement (LSA) a peer-to-peer (P2P) adjacency to each member of the broadcast network that has bidirectional IGP communication with the network element instead of advertising a pseudo-node adjacency to the pseudo-node of the broadcast network. Each P2P adjacency includes a high cost to discourage use of those links for transit traffic. After LDP becomes operational with all neighbors on the broadcast interface, the network element advertises the pseudo-node adjacency instead of the P2P adjacencies. Accordingly, transit traffic is avoided through that network element until LDP is operational with all neighbors on the broadcast interface.

20 Claims, 7 Drawing Sheets

OTHER PUBLICATIONS

Morin, T., et al., Mulitcast Blackhole Mitigation with PIM Adjacency Conditions on Routing Announcements, Network Working Group, Internet Draft, Feb. 25, 2008, 12 pages.

PCT International Search Report and Written Opinion for PCT/US2010/023947, mailed Apr. 16, 2010, 9 pages.

Office Action for U.S. Appl. No. 12/421,443, mailed Dec. 14, 2010, 22 pages.

Rajiv Asati et al., LDP End-of-LIB draft-ietf-mpls-ldp-end-of-lib-03.txt, MPLS Working Group, Internet Draft, Jan. 14, 2009, 10 pages.

J. Moy, OSPF Version 2, Request for Comments: 2328, Apr. 1998, 244 pages.

L. Andersson, et al., LDP Specification, Request for Comments: 5036, Oct. 2007, 135 pages.

M. Jork et al., LDP IGP Synchronization, Request for Comments: 5443, Mar. 2009, 7 pages.

W. Lu et al., LDP IGP Synchronization for Broadcast Networks draft-lu-ldp-igp-sync-bcast-00.txt, Internet Draft, Mar. 4, 2009, 8 pages.

LDP IGP SYNCHRONIZATION FOR BROADCAST NETWORKS

BACKGROUND

1. Field

Embodiments of the invention relate to the field of networking; and more specifically to LDP (Label Distribution Protocol) IGP (Interior Gateway Protocol) synchronization for broadcast networks.

2. Background

LDP, described in "LDP Specification", RFC 5036, October 2007, which is used to establish LSPs (label switched paths) to destinations, typically relies on IGP (e.g., Open Shortest Path First (OSPF), defined in "OSPF Version 2", STD 54, RFC 2328, April 1998, Intermediate system to Intermediate system (IS-IS), defined in "Intermediate system to intermediate system intra-domain-routing routine information exchange protocol for use in conjunction with the protocol for providing the connectionless-mode Network Service (ISO 8473)" ISO standard 10589, 1992, etc.) to provide the underlying routing information for LDP (e.g., the cost metric between the hops in the network). Even though LDP typically relies on the IGP protocol, they are independent from each other. Typically, IGP converges faster than LDP converges As a result, IGP may be operational on a link prior to LDP becoming operational on that link which can lead to packet loss.

The request for comments (RFC) 5443, "LDP IGP Synchronization", March 2009 (hereinafter "LDP IGP Synchronization") describes a mechanism to discourage links from being used for IP forwarding if LDP is not fully operational on that link. RFC 5443 describes that when LDP is not fully operational on a given link (e.g., all the label bindings have not yet been exchanged), IGP will advertise the link with maximum cost to discourage traffic from being sent over the link. When LDP on the link becomes operational (e.g., all label bindings have been exchanged), IGP advertises the link with the correct cost.

On broadcast links (more than one LDP/IGP peer on the same link), IGP advertises a common cost to the broadcast link, rather than a separate cost to each peer. A broadcast pseudo-node may be implemented in a network to reduce the number of links in the shortest path first (SPF) (e.g., open shortest path first (OSPF), constrained shortest path first (CSPF)) database of each network element. Each network element forms adjacencies with the broadcast pseudo-node and advertises a link and cost to the broadcast pseudo-node and the broadcast pseudo-node advertises a link and cost to each network element. One of the network elements in the broadcast network acts as a Designated Router (DR) of that network and is responsible for advertising the link and cost from the broadcast pseudo-node to the members of the broadcast network.

For broadcast links, the RFC 5443 "LDP IGP Synchronization" describes that the mechanism can be applied to the link as a whole but not to an individual peer. Advertising maximum cost to the link as a whole may cause sub-optimal traffic diversion and/or black-holing of traffic (e.g., traffic carried on the LSP such as VPN traffic).

SUMMARY

Methods and apparatuses for LDP-IGP synchronization for broadcast networks are described. According to one embodiment of the invention, a network element for use in a broadcast network that depends on the establishment of Label Switched Paths (LSPs) by a label distribution protocol (LDP) that is tied to Internet Protocol (IP) forwarding decisions of an interior gateway protocol (IGP) is adapted to assist in avoiding black-holing of traffic and sub-optimal traffic diversion caused by IGP converging prior to LDP converging. The network element includes a broadcast network interface adapted to carry transit traffic through an LSP when LDP is operational, an LDP module to exchange label bindings with neighbors of the network element, and an IGP module. The IGP module, responsive to bringing up an IGP adjacency with the Designated Router (DR), is operative to advertise a high cost peer-to-peer (P2P) adjacency for the broadcast network interface to each member of the broadcast network that is in a state of bidirectional IGP communication with the network element in a Link State Advertisement (LSA) of the network element instead of advertising a pseudo-node adjacency for the broadcast network interface to a pseudo-node of the broadcast network in that LSA to discourage use of the broadcast interface for transit traffic, where the pseudo-node represents the topology of the broadcast network, and the pseudo-node adjacency represents the unidirectional link from the network element to the pseudo-node. After LDP becomes operational with all neighbors on the broadcast interface, the IGP module is further operative to advertise the pseudo-node adjacency for the broadcast network interface to the pseudo-node in its LSA instead of advertising the P2P adjacencies, thereby removing the discouragement of the use of the broadcast network interface for transit traffic. Thus, transit traffic is avoided on the broadcast network interface until LDP is operational with all neighbors on that broadcast interface.

In another embodiment of the invention, a network element for use in a broadcast network that acts as a DR for the broadcast network which depends on the establishment of LSPs by an LDP that is tied to IP forwarding decisions of an IGP, includes a broadcast network interface that is adapted to carry transit traffic through an LSP, and an IGP module. The IGP module is operative to advertise pseudo-node LSAs on the broadcast network interface on behalf of a pseudo-node of the broadcast network to members of the broadcast network, where the pseudo-node represents the topology of the broadcast network, and where each pseudo-node LSA includes an indication of each member of the broadcast network that is adjacent to the DR. The IGP module is further operative to advertise high cost P2P adjacencies to the members of the broadcast network on the broadcast network interface as they are becoming adjacent to the DR, where each P2P adjacency represents a unidirectional link between the DR and a member of the broadcast network, and where the P2P adjacencies are advertised to discourage transmitting transit traffic to those members on the unidirectional links represented by the P2P adjacencies. The IGP module is further operative to cease the advertisement of the P2P adjacencies to those members of the broadcast network that have themselves advertised an LSA to the DR that does not include a P2P adjacency and have become adjacent to the DR. Thus, transit traffic is avoided on a unidirectional link to a member of the broadcast network until the DR receives an LSA from that member that does not include a P2P adjacency.

In another embodiment of the invention, a network element for use in a broadcast network that is adjacent to the DR of the broadcast network and has a bidirectional link to a pseudo-node of the broadcast network, where the broadcast network depends on the establishment of LSPs by an LDP that is tied to IP forwarding decisions of an IGP to function correctly, includes a broadcast network interface adapted to carry transit traffic through an LSP, and an IGP module. The IGP module is operative to receive LSAs from members of the broadcast network including pseudo-node LSAs from the DR that each include an indication of each member of the broadcast network that is adjacent to the DR. The IGP module further is operative to advertise a high cost P2P adjacency to each of those of the members of the broadcast network that are currently themselves advertising a P2P adjacency, where each P2P adjacency represents a unidirectional link between the network element and a member of the broadcast network, and where the P2P adjacencies are advertised to discourage transmitting transit traffic to those members on the unidirectional links represented by the P2P adjacencies. Upon receipt of an LSA that does not include a P2P adjacency from a member, the IGP module is further operative to cease the advertisement of the P2P adjacency to that member.

In another embodiment of the invention, a network element in a broadcast network assists in avoiding black-holing of traffic and sub-optimal traffic diversion in the broadcast network due to IGP converging prior to LDP converging, where the broadcast network depends on the establishment of LSPs by LDP that is tied to Internet IP forwarding decisions of IGP, where the network element is bringing up an adjacency with the DR of the broadcast network. The network element receives a pseudo-node LSA a broadcast network interface of the network element from the DR responsive to an establishment of bidirectional IGP communication with the DR, where the pseudo-node LSA includes an indication of the network element members of the broadcast network. The network element advertises, to each of the network element members of the broadcast network that has bidirectional IGP communication with the network element, a high cost P2P adjacency in its LSA instead of an adjacency to the pseudo-node of the broadcast network, to discourage use of the broadcast network interface for transmit traffic, where the adjacency to the pseudo-node represents the link between the pseudo-node and the network element. Responsive to LDP becoming operational with each of the neighbors on the broadcast network interface, the network element advertises the adjacency to the pseudo-node in its LSA for the broadcast network interface instead of the P2P adjacencies thereby removing the discouragement of the use of the broadcast network interface for transit traffic. Thus, transit traffic is avoided on the broadcast network interface while LDP is not operational with the network element members of the broadcast network.

In another embodiment of the invention, a broadcast network that depends on the establishment of LSPs by LDP that is tied to IP forwarding decisions of IGP, wherein the broadcast network is adapted to avoid black-holing of traffic and sub-optimal traffic diversion caused by IGP converging prior to LDP converging, the broadcast network includes multiple network elements that each include a broadcast network interface, an LDP module that exchanges label bindings with members of the broadcast network on the broadcast network interface, and an IGP module. The IGP module substitutes, while LDP is not operational with the members of the broadcast network on the broadcast network interface, advertising pseudo-node adjacencies in its LSAs with P2P adjacencies having a high cost to those members that have bidirectional IGP communication with the network element to discourage use of the broadcast network interface for transit traffic. The IGP module replaces, responsive to LDP becoming operational with the network element members of the broadcast network on the broadcast network interface, the P2P adjacencies in its LSA with the pseudo-node adjacency thereby removing the discouragement of the use of the broadcast network interface for transit traffic. The IGP module also advertises a high cost P2P adjacency to those of the network element members that have bidirectional IGP communication with the network element and are themselves advertising a P2P adjacency with a high cost to avoid those links to those network element members in forwarding decisions. Thus, transit traffic is avoided on links in the broadcast network on which LDP is not operational.

Thus transit traffic is avoided on a broadcast interface until LDP is operational on that interface without the transit traffic being black-holed or diverted to a sub-optimal path.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
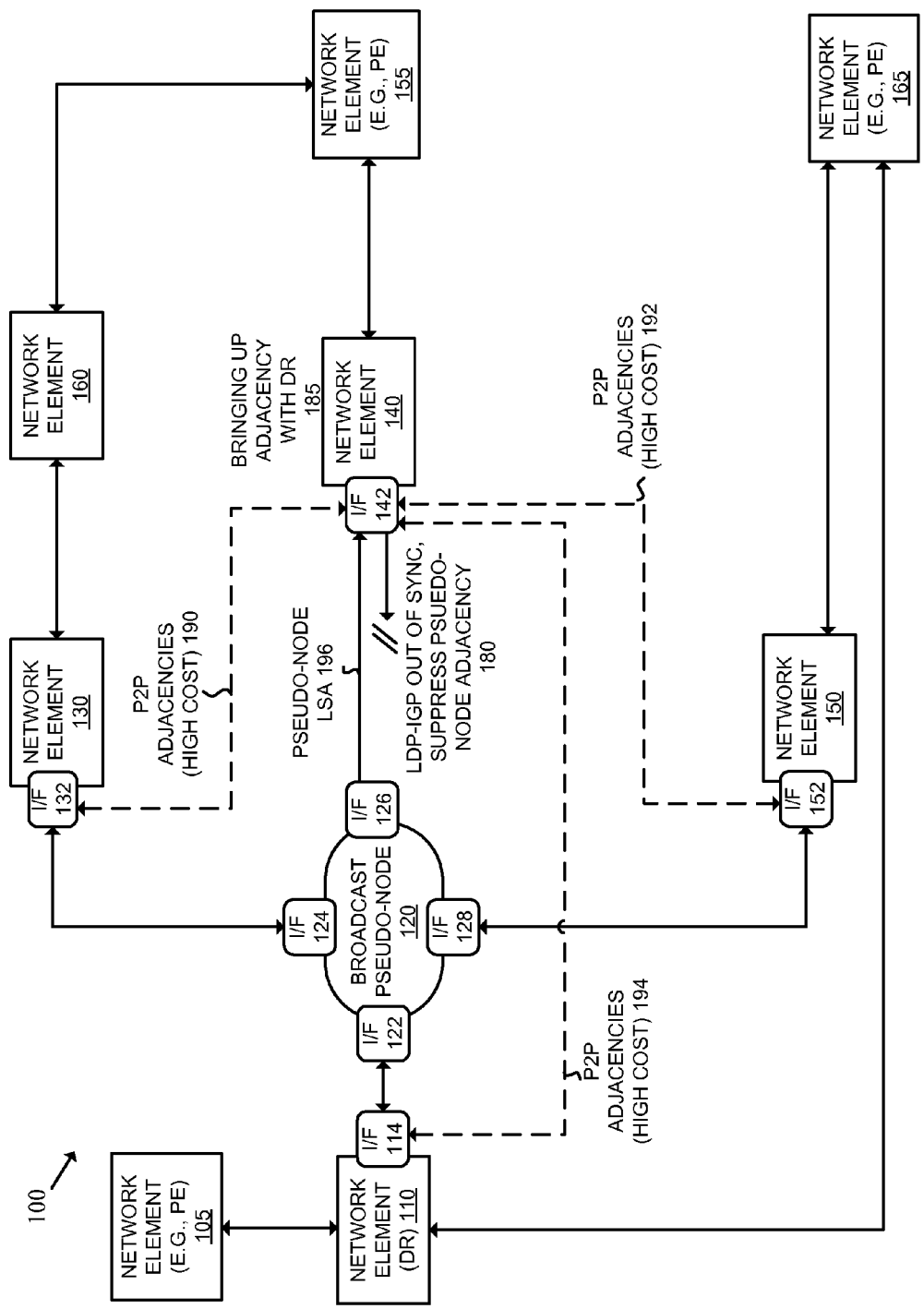
FIG. 1 illustrates an exemplary broadcast network where LDP and IDP are not synchronized on a member of the network element that is bringing up an IGP adjacency with a Designated Router (DR) of the broadcast network according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The techniques shown in the figures can be implemented using code and data stored and executed on one or more electronic devices (e.g., an end station, a network element, etc.). Such electronic devices store and communicate (internally and/or with other electronic devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, etc.) is a piece of networking equipment, including hardware and software, that communicatively interconnects other equipment on the network (e.g., other network elements, end stations, etc.). Some network elements are "multiple services network elements" that provide support for multiple networking functions (e.g., routing, bridging, switching, Layer 2 aggregation, session border control, and/or subscriber management), and/or provide support for multiple application services (e.g., data, voice, and video). Subscriber end stations (e.g., servers, workstations, laptops, palm tops, mobile phones, smartphones, multimedia phones, Voice Over Internet Protocol (VoIP) phones, portable media players, GPS units, gaming systems, set-top boxes, etc.) access content/services provided over the Internet and/or content/services provided on virtual private networks (VPNs) overlaid on the Internet. The content and/or services are typically provided by one or more end stations (e.g., server end stations) belonging to a service or content provider or end stations participating in a peer to peer service, and may include public webpages (free content, store fronts, search services, etc.), private webpages (e.g., username/password accessed webpages providing email services, etc.), corporate networks over VPNs, etc. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

Within certain network elements, multiple "interfaces" may be configured. As used herein an interface is a connection between a network element and one of its attached networks. An interface has information associated with it that is typically obtained from underlying lower level protocols and the routing protocol (e.g., an IP address and mask). An interface is sometimes referred to as a link. A broadcast interface is an interface that is connected with a broadcast network (sometimes referred to as a "broadcast network interface").

As used herein, the term "link state advertisement" (LSA) is protocol agnostic. For example, if the IGP is Open Shortest Path First (OSPF), then the link state advertisements can include Router-LSAs, Network-LSAs, etc. If the IGP is intermediate system to intermediate system (IS-IS), then the LSAs can be Link State PDUs, pseudonode LSPs, etc.

A method and apparatus for LDP-IGP synchronization for broadcast networks is described. In one embodiment of the invention, responsive to a network element bringing up an adjacency with a DR of the broadcast network on a broadcast interface, that network element advertises in its LSA for the broadcast interface a peer-to-peer (P2P) adjacency to each member of the broadcast network that has bidirectional IGP communication with the network element instead of advertising a pseudo-node adjacency to the pseudo-node of the broadcast network. Each P2P adjacency includes a high cost to discourage use of those links for transit traffic. After LDP becomes operational with all neighbors on that broadcast interface, the network element advertises the pseudo-node adjacency instead of the P2P adjacencies. Accordingly, transit traffic is avoided through that network element until LDP is operational with all neighbors of the network element.

In another embodiment of the invention, on a DR of the broadcast network, responsive to an adjacency being established between the DR and a neighbor of the broadcast network, the DR advertises a high cost P2P adjacency to the neighbor in its LSA to discourage transmission of transit traffic through that neighbor. The high cost P2P adjacency to that neighbor remains until the DR receives an LSA from that neighbor that does not include a P2P adjacency, which at that point the DR assumes that LDP is operational on that network element and the DR removes the P2P adjacency. Accordingly, transit traffic is avoided through that network element until LDP is operational on that network element.

In another embodiment of the invention, on a network element that is a member of the broadcast network that is adjacent to the DR of the broadcast network, responsive to receiving a pseudo-node LSA, the network element advertises in its LSA a high cost P2P adjacency to each neighbor listed in the pseudo-node LSA that are themselves advertising a high cost P2P adjacency to discourage transit traffic from being transmitted through those neighbors. Responsive to receiving an LSA from one of those neighbors that does not include a P2P adjacency, the network element assumes that LDP is operational on that neighbor and removes the high cost P2P adjacency to that neighbor.

In one embodiment, if the IGP protocol is Open Shortest Path First (OSPF), the Router-LSA of a network element that is bringing up an IGP adjacency with the DR of the broadcast network is not updated with a Link Type 2 (link to transit network) for the subnet until LDP is operational with all network elements on that subnet.

In one embodiment, if the IGP protocol is intermediate system to intermediate system (IS-IS), the Link State PDU of a network element that is bringing up an IGP adjacency with the DR of the broadcast network is not updated with an IS Reachability TLV (or an Extended IS Reachability TLV) to the broadcast network until LDP is operational with all network elements.

FIG. 1 illustrates an exemplary broadcast network where LDP and IDP are not synchronized on a member of the network element that is bringing up an IGP adjacency with a Designated Router (DR) of the broadcast network according to one embodiment of the invention. Initially, the network 100 includes the network elements 105, 110, 130, 150, 155, 160, and 165, and the broadcast pseudo-node 120. The network elements 110, 130, and 150 are each directly coupled with the broadcast pseudo-node 120. Thus, the network elements 110, 130, and 150 are part of the broadcast network. After some time, the network element 140 is brought up on the network 100 and will be part of the broadcast network. It should be understood that the topology of the network 100 is exemplary, and other topologies may be used in embodiments of the invention. For example, in some embodiments, a broadcast pseudo-node is not used.

In one embodiment, the network elements 105, 155, and 165 provider edge network elements and the network 100 is a Multiprotocol Label Switching (MPLS) network with Virtual Private Network (VPN) applications. As one example, the network element 105 may have a LDP LSP path to the network elements 155 and/or 165. It should be understood that other LDP LSP paths may be established in the network 100. Thus the network 100 depends on the establishment of Label Switched Paths (LSPs) by a label distribution protocol (LDP) that is tied to Internet Protocol (IP) forwarding decisions of an interior gateway protocol (IGP).

The network element 110 acts as a designated router (DR) of the broadcast network. Thus, the network element (DR) 110 manages the broadcast pseudo-node 120. For example, the network element (DR) 110 generates a unidirectional link from the broadcast pseudo-node 120 to the members of the broadcast network (e.g., the network elements 130, 140 and 150) in the form of a pseudo-node LSA (e.g., a network-LSA in OSPF or a pseudo-node LSP in IS-IS). It should be understood that the election of the network element 110 to be the DR of the broadcast network is exemplary, and different network element members of the broadcast network may be elected to be the DR in embodiments of the invention described herein.

The network elements 130 and 150 are adjacent to the network element (DR) 110. In addition, LDP is fully operational on the network elements 130 and 150. The network elements 130 and 150 each advertise a pseudo-node adjacency in their LSA (e.g., a router-LSA in the case of OSPF). The network element (DR) 110 also advertises a pseudo-node adjacency in its LSA. A pseudo-node adjacency represents the link between the broadcast pseudo-node 120 and the network element. The network elements 110, 130, and 150 advertise their LSAs to their neighbors. It should be understood that each pseudo-node adjacency has a cost value (which can be different for different network elements).

The network element (DR) 110 also advertises the interfaces of the broadcast pseudo-node 120 to its neighbors (e.g., those network elements that either is adjacent to the network element (DR) 110 or is bringing up an adjacency with the network element (DR) 110) in a pseudo-node LSA (e.g., a network-LSA in OSPF or a pseudo-node LSP in IS-IS). Each of the interfaces 122, 124, 126, and 128 is advertised with a cost of zero. It should be understood that the interfaces illustrated in FIG. 1 are exemplary and other interfaces are not illustrated in order not to confuse understanding of the invention.

For purposes of explanation, the network elements 110, 130, and 150 each advertise a pseudo-node adjacency with a cost of 1 on the broadcast interfaces 114, 132, and 152 respectively. In addition, for exemplary purposes, the other links in the network 100, with the exception of the link between the network element (DR) 110 and the network element 165 (which is advertised a cost of 10), are also advertised with a cost of 1.

By way of example, prior to the broadcast network including the network element 140, transit traffic between the network element 105 and the network element 155 flows along the bidirectional path [network element 105↔network element 110↔network element 130↔network element 160↔network element 150], and transit traffic between the network element 105 and the network element 165 flows along the bidirectional path [network element 105↔network element 110↔network element 150↔network element 165].

As illustrated in FIG. 1, the network element 140 is bringing up an adjacency to the network element (DR) 110 (e.g., by performing the bringing up adjacency with DR operation 185). Thus, the network element 140 has exchanged hello packets with the network element (DR) 110 (thus there is bidirectional IGP communication between the network element 140 and the network element (DR) 110). As illustrated in FIG. 1, the network element (DR) 110 transmits the pseudo-node LSA 196 to the network element 140 over interface 126.

In one interpretation of the RFC 5443 "LDP IGP Synchronization" as applied to broadcast networks, when a new network element is discovered on the broadcast network (e.g., is bringing up an adjacency with the DR), all the network elements with direct links to the broadcast network advertise maximum cost to the broadcast network. For example, with reference to FIG. 1, if the broadcast interface 142 of the network element 140 becomes operational (e.g., the network element 140 is bringing up an adjacency with the network element (DR) 110 over the broadcast interface 142 while the network elements 110, 130, and 150 are each already connected with the broadcast pseudo-node 120) and detected by the network elements 110, 130, and 150, those network elements each start advertising maximum cost to the broadcast pseudo-node 120. In other words, the network elements 110, 130, and 150 react to the network element 140 coming up on the network by advertising a maximum cost pseudo-node adjacency to the broadcast pseudo-node 120. The RFC 5443 defines the value of the maximum cost to be LSInfinity (0xFFFF) for OSPF and (0xFFFFFE) for IS-IS. Since maximum cost is greater than the cost of 10, following this interpretation of the RFC 5443 causes transit traffic between the network element 105 and the network element 165 to be diverted to the sub-optimal path of [network element 105↔network element 110↔the network element 165] instead of the optimal path [network element 105↔network element 110↔network element 150↔network element 165] as described above. Thus, using the interpretation of the RFC 5443 that each network element member of the broadcast network advertising a maximum cost to the broadcast network may result in sub-optimal traffic diversion.

In addition, applying the mechanism described in the RFC 5443 "LDP IGP Synchronization" for broadcast networks can lead to traffic being black-holed (continually dropped) at a network element due to each broadcast network element advertising a maximum cost. For example, using the network topology of FIG. 1 and the same links as the previous example, using this interpretation of the RFC 5443 when the network element 140 is coming up on the broadcast network, the network element 110 will have the network element 140 as the nexthop to the network element 155 resulting in VPN traffic from the network element 105 to the network element 155 being black-holed at the network element 110 until LDP is operational at the network element 140. The amount of traffic loss in this case is at least the order of the time it takes for the LDP LSP to become operational. Although the topology in FIG. 1 is rather simple, it should be understood that in some topologies this can be of the order of several minutes (which can violate carrier class reliability metrics).

In another interpretation of the RFC 5443 as applied to broadcast networks, when a new network element is discovered on the broadcast network, only that network element advertises a maximum cost to the broadcast network and the other network elements advertise their normal cost. In this interpretation, for example, the network element 140 advertises a maximum cost pseudo-node adjacency to the broadcast pseudo-node 120 while the network elements 110, 130, and 150 each advertise their pseudo-node adjacency to the broadcast pseudo-node 120 at their regular cost. It should be understood that the maximum cost pseudo-node adjacency affects traffic to the broadcast pseudo-node 120 (i.e., traffic outgoing from the broadcast interface 142) and does not affect traffic transmitted to the network element 140 on the broadcast interface 142. For example, from the point of view of the network element (DR) 110, the link between the network element 110 and the network element 140 will have a cost of 1. Using the same example as above and since IGP will converge faster than LDP, the network element 110 will try and fail to transmit VPN traffic to the network element 155 through the network element 140 until that LDP LSP has been established through the network element 140. Thus, similar to the above example, the VPN traffic will be black-holed at the network element 110.

In contrast, embodiments of the invention allow for LDP-IGP synchronization in broadcast networks without sub-optimally diverting traffic or black-holing traffic. As illustrated in FIG. 1, responsive to the network element 140 bringing up an adjacency with the network element (DR) 110 on the broadcast interface 142, the network element 140 suppresses advertising its pseudo-node adjacency 180 to the broadcast pseudo-node 120 (e.g., is not advertised) in its LSA and instead advertises in its LSA a peer-to-peer (P2P) adjacency to each network element listed in the pseudo-node LSA 196 received from the broadcast pseudo-node 120 (at least those network elements in the pseudo-node LSA that have bidirectional IGP communication with the network element 140). Each P2P adjacency represents a unidirectional link between network elements. For example, the network element 140 includes in its LSA a P2P adjacency to the network elements 110, 130, and 150, which respectively represent the following unidirectional links: [network element 140→network element (DR) 110], [network element 140→network element 130], and [network element 140→network element 150]. This LSA is advertised to the neighbors of the network element 140 (e.g., the network elements 110, 130, 150, and 155, which then populate the LSA to the rest of the routing domain). Each P2P adjacency is advertised with a high cost (e.g., the maximum cost) to discourage use of the link represented by the P2P adjacency. The value of the high cost is chosen such that those links will be used as last resort links.

It should be understood that the high cost P2P adjacencies advertised by the network element 140 affect only the traffic outgoing from the network element 140 (that is, traffic outgoing from the broadcast interface 142). Therefore, the other network element members in the broadcast network (the network elements 110, 130, and 150) also each advertise in their LSAs a high cost P2P adjacency on their broadcast interfaces to the network element 140. Therefore, the unidirectional links to the network element 140 in the broadcast network are also advertised with a high cost to discourage use of those links. Therefore as illustrated in FIG. 1, the P2P adjacencies 190 between the network elements 130 and 140, the P2P adjacencies 192 between the network elements 150 and 140, and the P2P adjacencies 194 between the network elements 110 and 140 are each advertised throughout the network 100. It should be understood that the network elements 110, 130, and 150 each continue to advertise a pseudo-node adjacency to the broadcast pseudo-node 120 in their respective LSAs.

Figure 2:
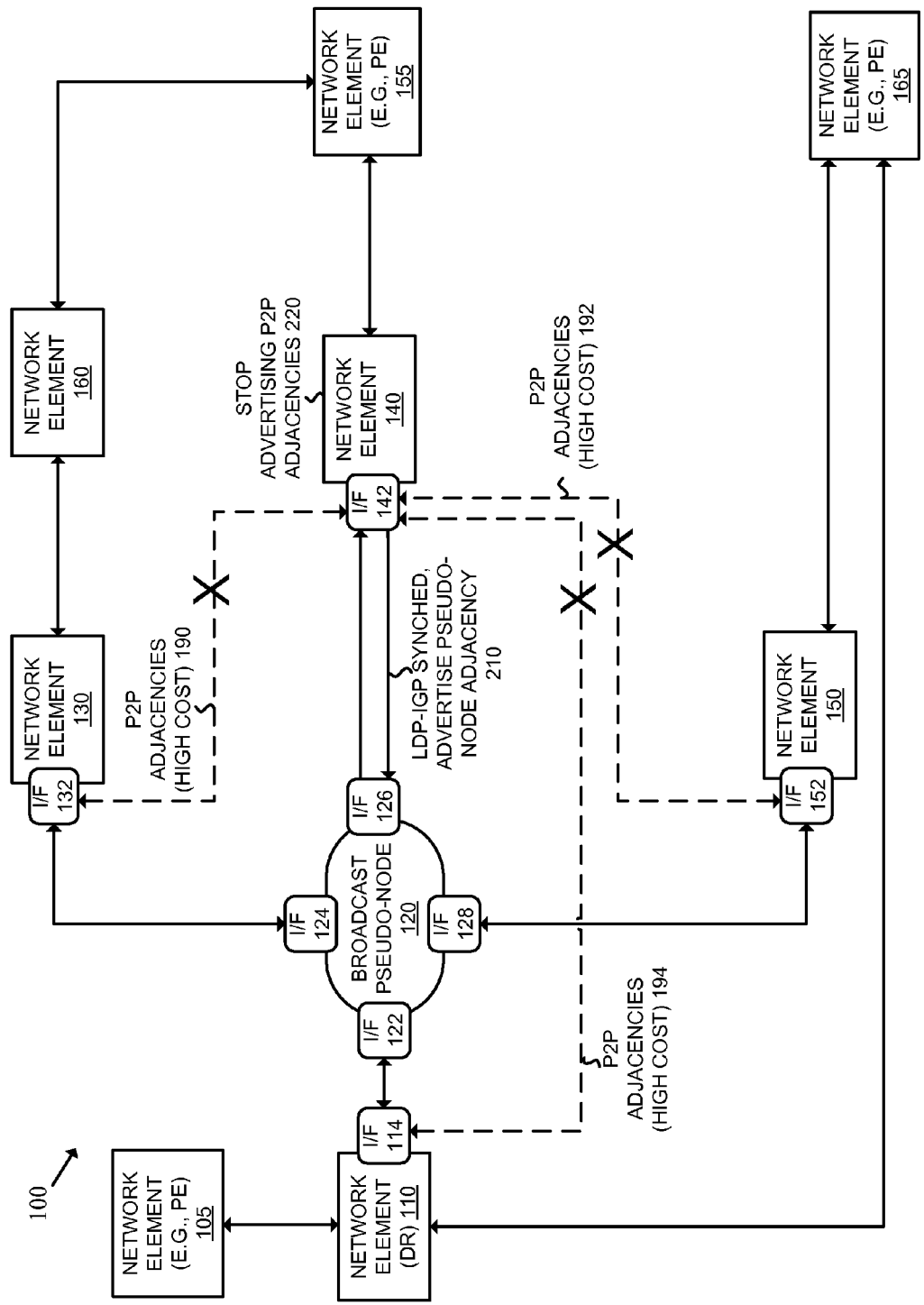
FIG. 2 illustrates the broadcast network of FIG. 1 where LDP and IGP are synchronized on the member that is bringing up an IGP adjacency with the DR of the broadcast network according to one embodiment of the invention.

The network element 140 maintains the suppression of the pseudo-node adjacency and the advertisements of the P2P adjacencies until LDP is operational with its neighbors. FIG. 2 illustrates the network of FIG. 1, where LDP is operational (synchronized with IGP) on the network element 140 according to one embodiment of the invention.

The network element 140 stops advertising the P2P adjacencies 220 to the network elements 110, 130, and 150 in its LSA after LDP is operational on the broadcast interface 142 therefore removing the discouragement of the use of the unidirectional links represented by the P2P adjacencies. In one embodiment, LDP is assumed to be operational upon an LDP-IGP synchronization timer expiring (which is set for a worst case (or best guess) of the time it should take for LDP to become operational). In another embodiment, the network element 140 may implement the LDP End-of-LIB mechanism as specified in IETF draft "LDP End-of-LIB: draft-ietf-mpls-end-of-lib-03.txt", January 2009, to determine when LDP is operational. For example, in LDP End-of-LIB IETF draft, each LDP peer (neighbor) may signal completion of its label advertisements following session establishment. After receiving all completion signals from each LDP peer, LDP will be operational with all neighbors. The network element 140 also unsuppresses the pseudo-node adjacency and advertises the pseudo-node adjacency 210 to the broadcast pseudo-node 120 with its regular cost. Thus in the LSA of the network element 140, the pseudo-node adjacency is advertised and the P2P adjacencies are no longer advertised.

The network elements 110, 130, and 150, upon receiving an LSA of the network element 140 that does not include a P2P adjacency, stops advertising their P2P adjacency to the network element 140 in their respective LSAs thereby removing the discouragement of the use of the unidirectional links represented by those P2P adjacencies to the network element 140. Thus, as illustrated in FIG. 2, the P2P adjacencies 190, 192, and 194 are no longer advertised.

Thus, unlike the RFC 5443, which would cause at least the network element 140 to advertise its pseudo-node adjacency for the broadcast interface 142 with a maximum cost until LDP is operational on the broadcast interface 142, in embodiments of the invention, the network element 140 advertises a high cost P2P adjacency to the members of the broadcast network (at least those members which have bidirectional IGP communication (2-way state) with the network element 140) in its LSA instead of the pseudo-node adjacency until LDP is operational on the broadcast interface 142. In addition, those other members also advertise a high cost P2P adjacency to the network element 140 in their LSAs until LDP is operational on the broadcast interface 142. As a result, transit traffic is avoided on the broadcast network and is not black-holed or diverted in a sub-optimal path.

Figure 3:
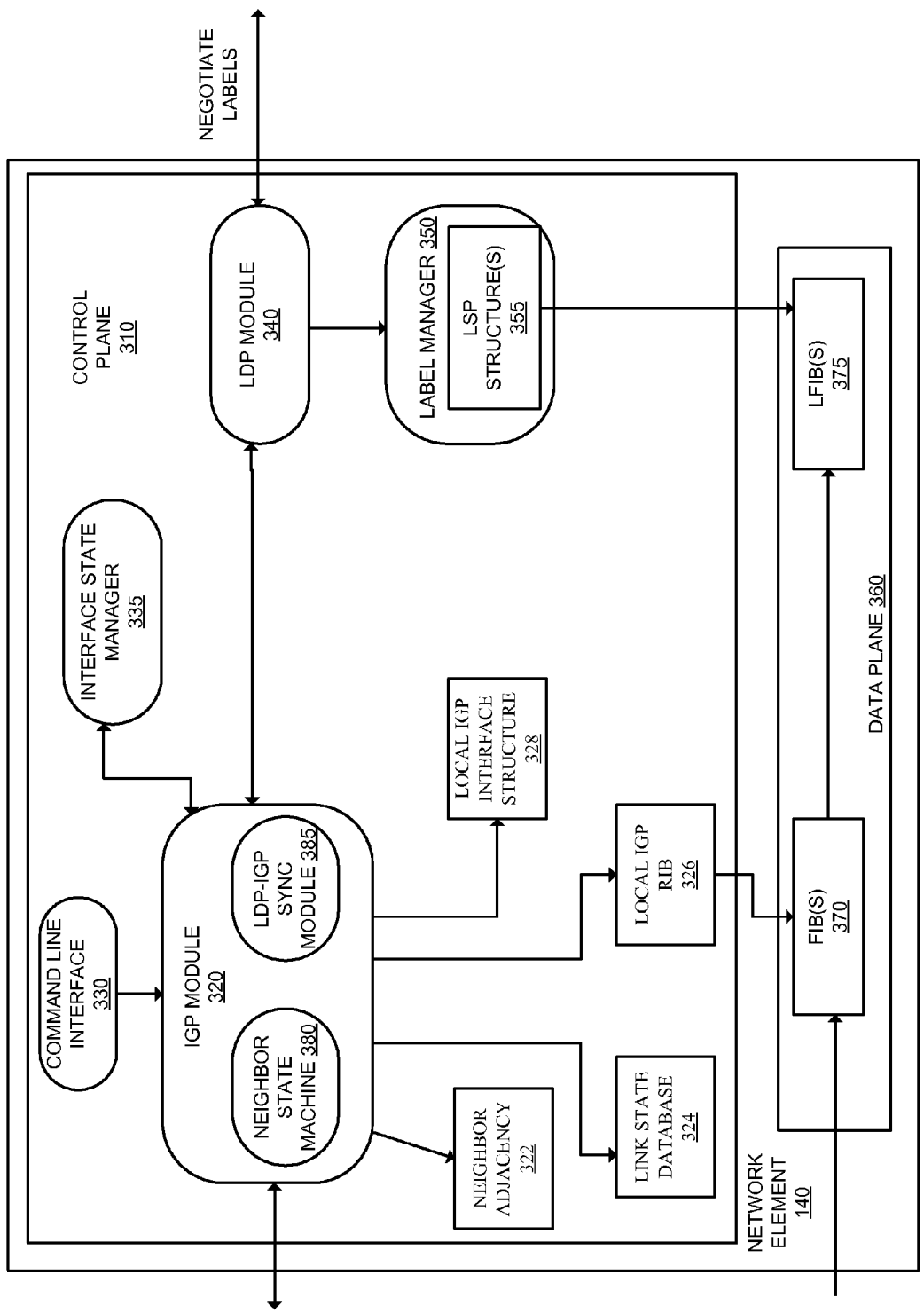
FIG. 3 is a block diagram of an exemplary network element adapted for LDP-IGP synchronization for broadcast networks according to one embodiment of the invention.

FIG. 3 is a block diagram of an exemplary network element configured for LDP-IGP synchronization for broadcast networks according to one embodiment of the invention. While FIG. 3 illustrates the network element 140, it should be understood that one or more of the network elements in the network 100 may include similar features. As illustrated in FIG. 3, the network element 140 includes the control plane 310, which is coupled with the data plane 360. The control plane 310 includes the command line interface 330, the IGP module 320, the interface state manager 335, the LDP module 340, and the label manager 350. The IGP module 320 includes the neighbor state machine 380 and the LDP-IGP synchronization LSA module 385. The IGP module 320 manages the neighbor adjacency table 322, the link state database 324, the local IGP RIB (routing information base) 326, and the local IGP interface structure 328.

The IGP module 320 may receive configuration parameters for LDP-IGP synchronization for broadcast networks from the command line interface 330. For example, a network administrator may use the command line interface 330 to configure the LDP-IGP synchronization for broadcast networks on the network element 140 (e.g., whether the LDP-IGP synchronization for broadcast networks is enabled, one or more interfaces to monitor for LDP-IGP synchronization for broadcast networks, etc.). In another embodiment, the LDP-IGP synchronization for broadcast networks mechanism is installed for each broadcast interface on the network element 140.

The interface state manager 335 manages the interfaces of the network element 140, including the broadcast interface 142. For example, the interface state manager 335 detects when an interface is operational. The interface state manager 335 is coupled with the IGP module 320. The IGP module 320 registers those broadcast interfaces (e.g., the interfaces as specified during configuration) with the interface state manager 335. The interface state manager 335 notifies the IGP module 320 upon a state change of one of those registered interfaces (e.g., a broadcast interface becoming operational, a broadcast interface going down, etc.). The IGP module 320 may then update the local IGP interface structure 328 with those interfaces.

The IGP module 320 establishes and maintains neighbor adjacencies with other network elements in the network 100. For example, the IGP module 320 transmits and receives hello packets from other network elements in the network 100. From these hello packets, the IGP module 320 creates and maintains the neighbor adjacency table 322.

The IGP module 320 also transmits and receives link-state information (typically in the form of link-state advertisements (LSAs)) to construct a topology of the network 100. From the LSAs it receives and transmits, the IGP module 320 creates and maintains the link state database 324 (thus the link state database 324 is a representation of the network topology of the network 100).

The IGP module 320 also includes the neighbor state machine 380. According to one embodiment when the IGP is OSPF, the neighbor state machine 380 operates as defined in the RFC 2328. For example, the neighbor state machine 380 manages the different neighbor state changes that occur (e.g., the states when establishing bidirectional IGP communication, the states when establishing an adjacency, etc.).

In one embodiment, the IGP module 320 also includes a shortest path first (SPF) process to determine the optimum paths to destinations of the link state database 324 (thus the SPF process is applied to the information of the link state database 324). The routes selected are added to the local IGP RIB 326, which are then programmed to one or more FIBs 370 (forwarding information bases) on the data plane 360. The routes may also be programmed to a main RIB on the control plane.

As previously described, the IGP module 320 transmits and receives LSAs to construct the topology of the network 100. The IGP module 320 includes the LDP-IGP synchronization LSA module 385 which excludes the pseudo-node adjacency from its LSAs for a broadcast interface until LDP is operational on that broadcast interface. In one embodiment, if LDP is not fully operational for a broadcast interface, the LDP-IGP synchronization LSA module 385 sets a suppress pseudo-node adjacency from LSA flag for that interface in the local IGP interface structure 328.

The LDP module 340 negotiates labels with the other network elements in the network 100. In one embodiment, the LDP module 340 determines when LDP is fully operational for a particular broadcast interface and notifies the IGP module 320 that LDP is fully operational for that interface. The IGP module 320 may then clear the suppress pseudo-node adjacency from LSA flag if it has been set (and then advertise that pseudo-node adjacency). The LDP module 340 is also coupled with the label manager 350, which creates and maintains the LSP structure(s) 355 which, among other things, create and manage the labels for the LSPs. The labels are programmed to one or more label forwarding information bases (LFIBs) in the data plane 360. For example, the labels stored in the LSP structure(s) 355 are programmed to one or more packet processing units of one or more line cards in the network element 140.

Figure 4:
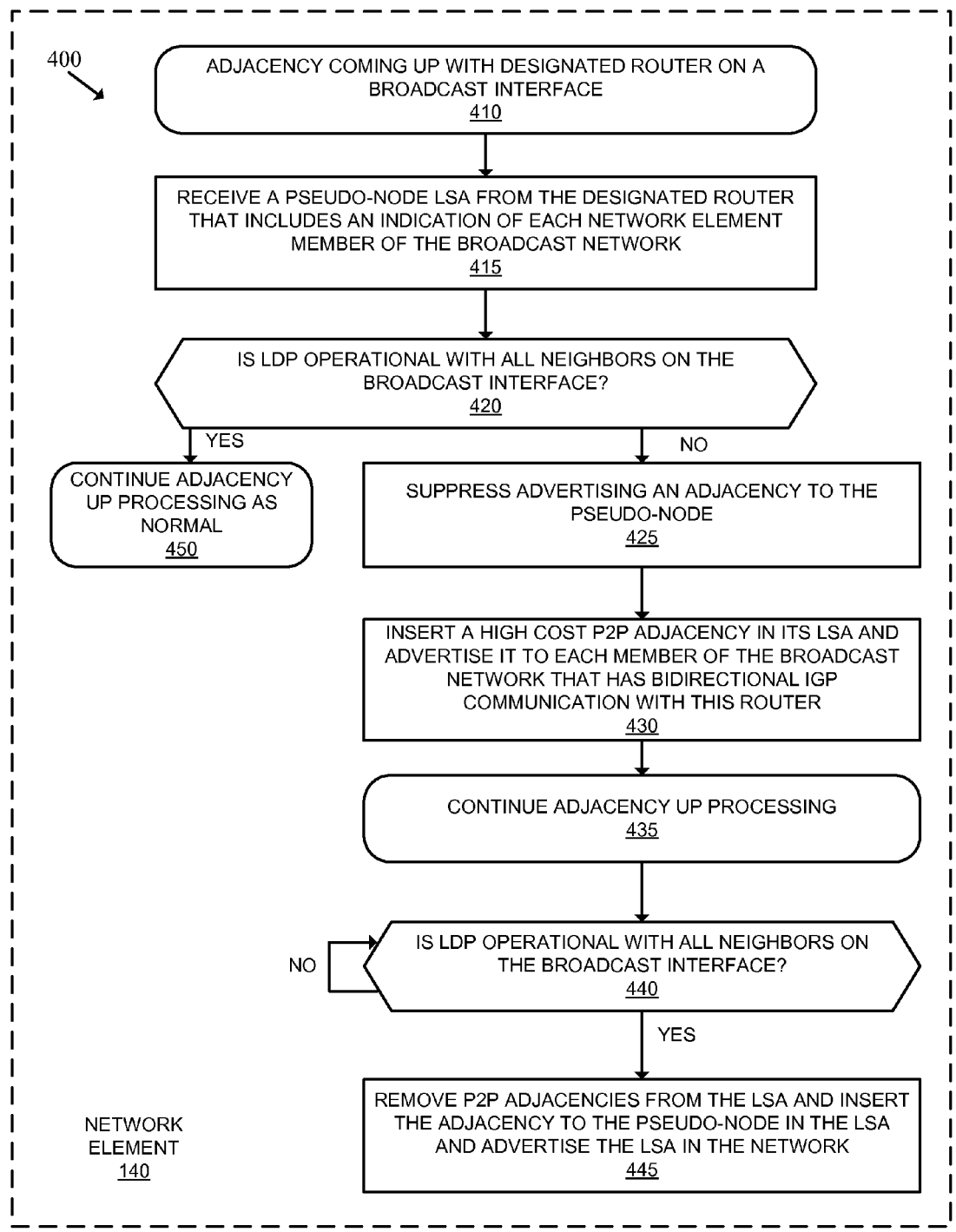
FIG. 4 is a flow diagram illustrating exemplary operations performed on a network element member of the broadcast network that is bringing up an IGP adjacency with the DR of the broadcast network to discourage use of a broadcast network interface for transit traffic until LDP is operational with all neighbors of that network element member according to one embodiment of the invention.

FIG. 4 is a flow diagram illustrating exemplary operations performed on a network element member of the broadcast network that is bringing up an IGP adjacency with the DR of the broadcast network to discourage use of a broadcast network interface for transit traffic until LDP is operational with all neighbors of that network element member according to one embodiment of the invention. The operations of FIG. 4 will be described with reference to the exemplary embodiments of FIGS. 1-3. However, it should be understood that the operations of FIG. 4 can be performed by embodiments of the invention other than those discussed with reference to FIGS. 1-3, and the embodiments discussed with reference to FIGS. 1-3 can perform operations different than those discussed with reference to FIG. 4.

As illustrated in FIG. 4, the network element 140 is performing the operations 400. The operations 400 begin at block 410 where an adjacency is coming up with the network element (DR) 110 on the broadcast interface 142. Flow moves to block 415, where the IGP module 320 receives the pseudo-node LSA 196 from the designated router. The pseudo-node LSA 196 includes an indication of each network element member of the broadcast network (e.g., the network elements 110, 130, and 150). Flow moves from block 415 to block 420.

At block 420, the IGP module 320 determines whether LDP is operational with all neighbors on the broadcast interface 142. According to one embodiment of the invention, the LDP-IGP synchronization module 385 operates an LDP-IGP synchronization timer which is set for an estimate on the time it should take for LDP to become operational. Upon that timer expiring, the LDP-IGP synchronization module 385 assumes that LDP is operational (and thus LDP and IGP are synchronized). In another embodiment, the LDP-IGP synchronization module 385 implements the draft IETF LDP End-of-LIB mechanism as described previously herein. If LDP is operational with all neighbors on the broadcast interface 142, then flow moves to block 450 where the adjacency up processing continues as normal, otherwise flow moves to block 425.

At block 425, the IGP module 320 suppresses advertising a pseudo-node adjacency to the broadcast pseudo-node 120. Suppressing that pseudo-node adjacency causes that pseudo-node adjacency not to be included in the link state database 324. The IGP module 320 also sets a suppress pseudo-node adjacency from LSA flag for the broadcast interface 142 in the local IGP interface structure 328. Flow moves from block 425 to block 430.

At block 430, the IGP module 320 inserts a high cost P2P adjacency to those members listed in the pseudo-node LSA that has bidirectional IGP communication with the network element 140 in its LSA and advertises that LSA to its neighbors. With reference to FIG. 1, P2P adjacencies at a high cost to the network elements 110, 130, and 150 are advertised in the LSA for the broadcast interface 142 (assuming they each have bidirectional IGP communication with the network element 140) to the network elements 110, 130, 150, and 155. The high cost P2P adjacencies discourages transit traffic from being transmitted through the broadcast interface 142 towards the network elements 110, 130, and 150. As will be described in greater detail later herein, the high cost P2P adjacencies also serve as an indication to the network elements 110, 130, and 150 that LDP is not yet operational on the broadcast interface 142 of the network element 140. Flow moves from block 430 to block 435 where the neighbor state machine 380 of the IGP module 320 continues the adjacency up processing.

Flow moves to block 435 to block 440, where the IGP module 320 determines whether LDP is operational with all neighbors on the broadcast interface 142. The OSPF module determines whether LDP is operational as described above with reference to block 420. If LDP is not operational, then flow moves back to block 440 where the IGP module 320 continues to wait until LDP is operational. However, if LDP is operational, then flow moves to block 445.

At block 445, the IGP module removes the P2P adjacencies from the LSA and inserts the pseudo-node adjacency in the LSA and advertises that LSA. With reference to FIG. 2, the P2P adjacencies from the network element 140 to the network elements 110, 130, and 150 have ceased being advertised and have been replaced with the pseudo-node adjacency to the broadcast pseudo-node 120, thereby removing the discouragement of the use of the broadcast interface 142 for outgoing transit traffic. As will be described in greater detail later herein, replacing the P2P adjacencies with the pseudo-node adjacency also serves as an indication to the network elements 110, 130, and 150 that LDP is now operational on the broadcast interface of the network element 140.

Figure 5A:
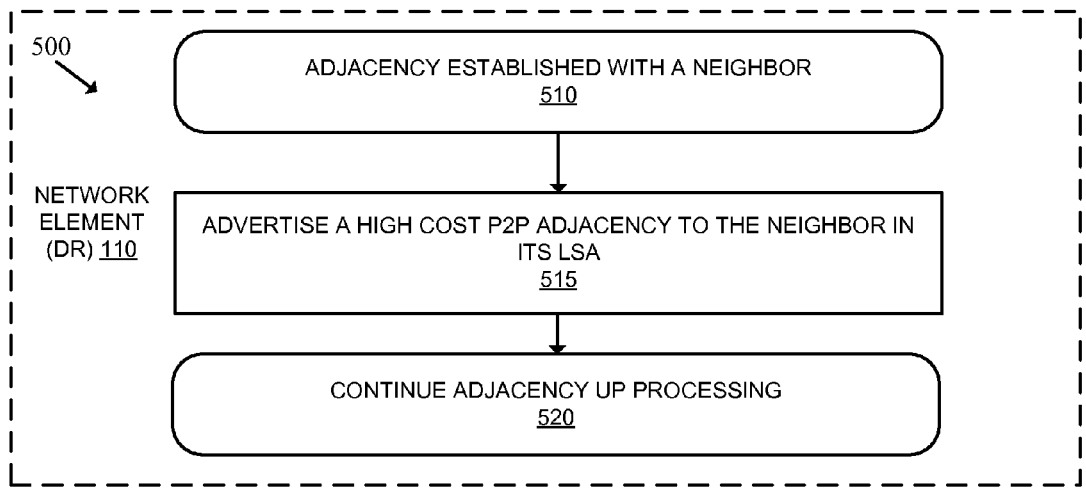
FIGS. 5A and 5B are flow diagrams illustrating exemplary operations performed on a network element member of the broadcast network that acts a DR of the broadcast network to discourage transmitting transit traffic through a neighbor network element until that neighbor indicates that LDP is operational according to one embodiment of the invention.
Figure 5B:
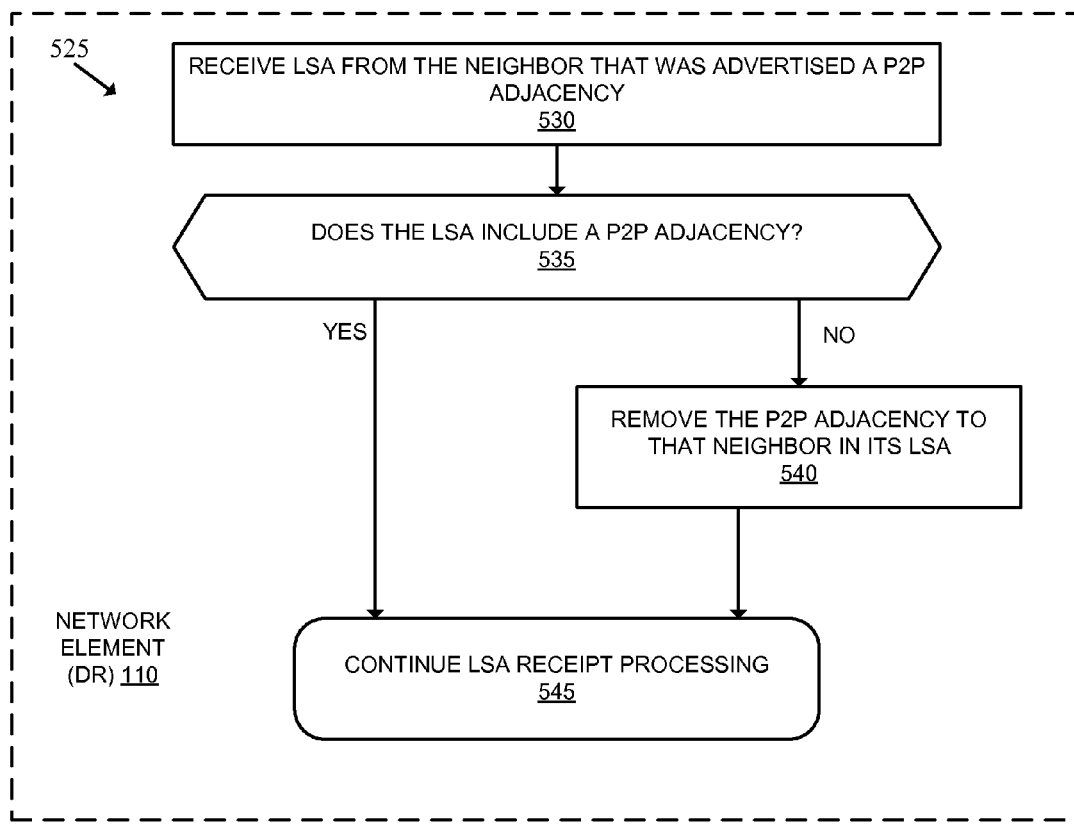

FIGS. 5A and 5B are flow diagrams illustrating exemplary operations performed on the network element (DR) 110. The operations of FIGS. 5A-B will be described with reference to the exemplary embodiments of FIGS. 1 and 2. However, it should be understood that the operations of FIGS. 5A-B can be performed by embodiments of the invention other than those discussed with reference to FIGS. 1 and 2, and the embodiments discussed with reference to FIGS. 1 and 2 can perform operations different than those discussed with reference to FIGS. 5A-B.

As illustrated in FIG. 5A, the network element (DR) 110 performs the operations 500. The operations 500 begin at block 510 where an adjacency is established with a neighbor (e.g., the network element 140) that is coming up on the network. At this point in time, the network element (DR) 110 assumes that LDP will not be operational since the network element 140 has just established an IGP adjacency (and thus transit traffic should not yet be sent to the network element 140). Thus, flow moves to block 515 where the IGP module advertises a high cost P2P adjacency to the network element 140 in its LSA to discourage use of the link to the network element 140 to transmit transit traffic. Flow moves from block 515 to block 520 to continue the normal adjacency up processing steps.

As illustrated in FIG. 5B, the network element (DR) 110 performs the operations 525. At block 530, the IGP module of the network element (DR) 110 receives an LSA from a neighbor that was advertised a P2P adjacency (e.g., an LSA for the broadcast interface 142 of the network element 140). Flow moves from block 530 to block 535. As described above with reference to FIG. 4, the high cost P2P adjacency advertised by the network element 140 for the broadcast interface 142 serves as an indication that LDP is not operational on the broadcast interface 142 (and thus transit traffic should be avoided being sent towards the broadcast interface 142). Therefore, at block 535, the IGP module of the network element (DR) 110 determines whether the received LSA includes a P2P adjacency. If the LSA includes a P2P adjacency, then flow moves to block 545 where the IGP module continues with LSA receipt processing. However, if the LSA does not include a P2P adjacency, then flow moves to block 540.

As described above, receiving an LSA from the network element 140 for the broadcast interface 142 that does not include a P2P adjacency serves as an indication that LDP is operational on that interface and that transit traffic may be sent toward the network element 140 (or at least considered by a SPF algorithm with its normal cost). Therefore, at block 540, the IGP module of the network element (DR) 110 removes the P2P adjacency to the network element 140 from its LSA, which removes the discouragement of transmitting transit traffic to that network element. With reference to FIG. 2, the network elements 110 and 140 have stopped advertising the P2P adjacencies 194 thereby removing the discouragement of the use of the bidirectional link between the network elements 110 and 140 for transmission of transit traffic. Flow moves from block 540 to block 545 where the IGP module continues with LSA receipt processing.

Figure 6A:
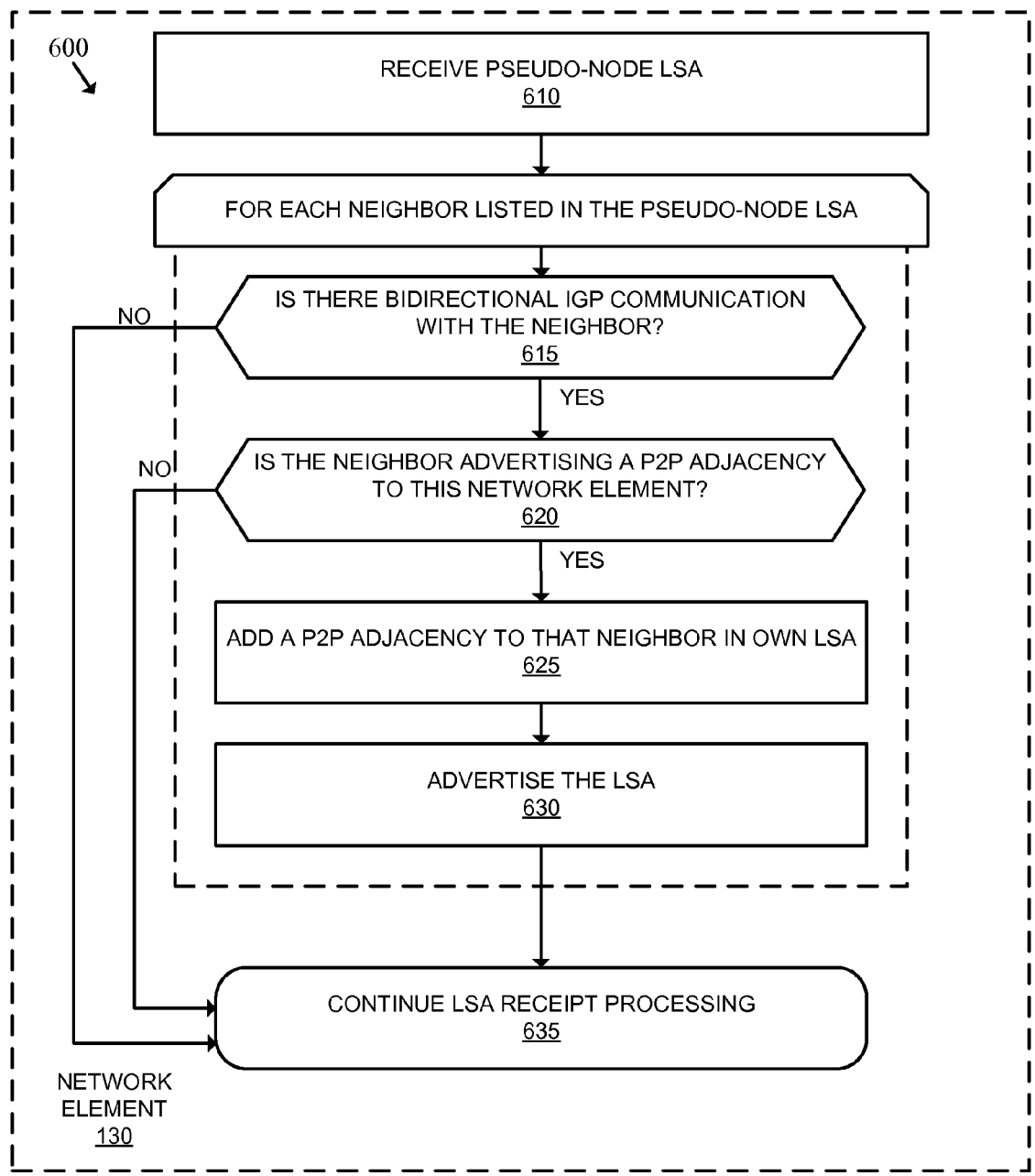
FIG. 6A is a flow diagram illustrating exemplary operations performed on a network element member of the broadcast network that is adjacent to the DR of the broadcast network responsive to receiving a pseudo-node LSA according to one embodiment of the invention.

FIG. 6A is a flow diagram illustrating exemplary operations performed on a network element member of the broadcast network that is adjacent to the DR of the broadcast network responsive to receiving a pseudo-node LSA according to one embodiment of the invention. The operations of FIG. 6A will be described with reference to the exemplary embodiments of FIG. 1. However, it should be understood that the operations of FIG. 6A can be performed by embodiments of the invention other than those discussed with reference to FIG. 1, and the embodiments discussed with reference to FIG. 1 can perform operations different than those discussed with reference to FIG. 6A.

As illustrated in FIG. 6A, the network element 130 performs the operations 600. However, it should be understood that other network elements in the network 100 perform similar operations (e.g., the network element 150). At block 610, the IGP module of the network element 130 receives a pseudo-node LSA of the broadcast pseudo-node 120. Flow moves from block 610 to block 615.

The operations in blocks 615-630 are performed for each neighbor listed in the pseudo-node LSA. For explanatory purposes, the operations of blocks 615-630 will be described with reference to the network element 140. At block 615, the IGP module of the network element 130 determines whether there is bidirectional IGP communication with network element 140. If there is not bidirectional IGP communication, then flow moves to block 635 where LSA receipt processing continues. It should be understood that if there is not bidirectional IGP communication, the bidirectional check during execution of the SPF will fail resulting in that link not being used to transmit transit traffic (thus there is no need to advertise a high cost P2P adjacency for that link). If there is bidirectional IGP communication, then flow moves to block 620.

At block 620, the IGP module determines whether the network element 140 is currently advertising a P2P adjacency to the network element 130 (e.g., whether the latest LSA received from the network element 140 includes a high cost P2P adjacency). In one embodiment the IGP module accesses its LSDB to determine whether the network element 140 is advertising a P2P adjacency. If the network element 140 is not advertising a P2P adjacency, then flow moves to block 635 where LSA receipt processing continues. However, if the network element 140 is advertising a P2P adjacency, then flow moves to block 625. By way of example, the network element 140 is currently advertising a P2P adjacency to the network element 130.

At block 625, the IGP module adds a high cost P2P adjacency to the network element 140 in its own LSA to discourage use of the link to the network element 140 for transit traffic. Flow then moves to block 630 where the LSA is advertised (e.g., flooded). With reference to FIG. 1, the P2P adjacencies 190 between the network elements 130 and 140 are advertised. Thus in each unidirectional direction, a high cost P2P adjacency has been advertised which discourages use of the bidirectional link between the network elements 130 and 140 for transit traffic. Flow then moves to block 635.

Figure 6B:
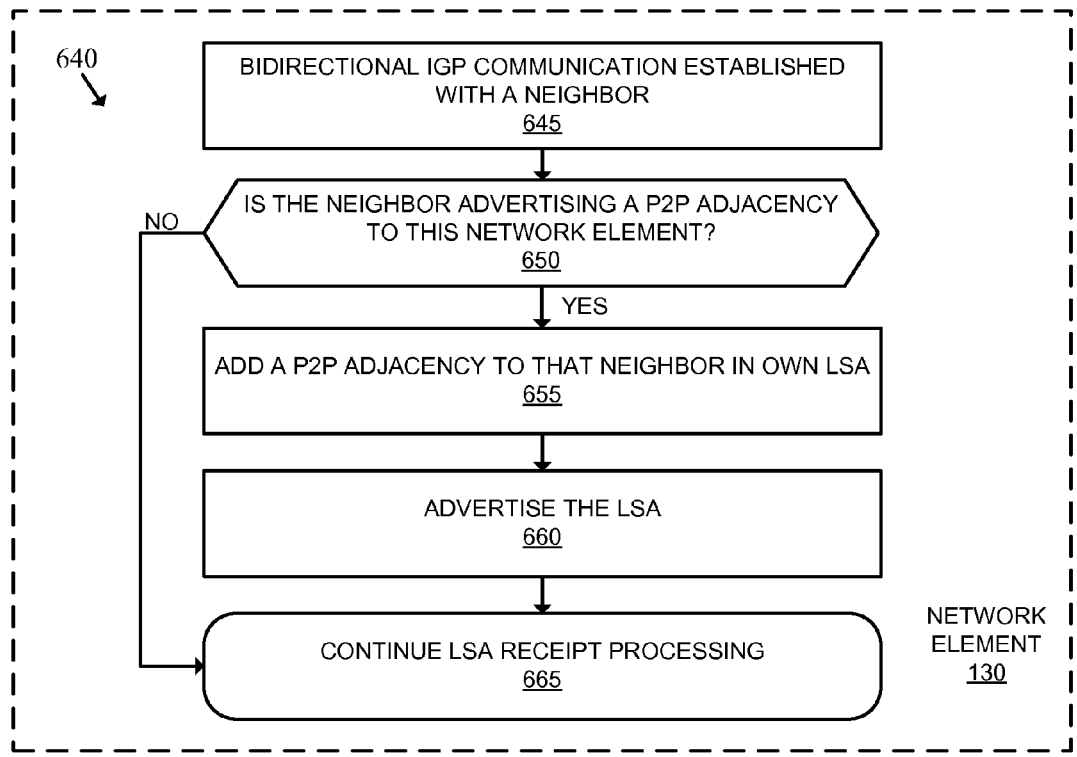
FIG. 6B is a flow diagram illustrating exemplary operations performed on a network element member of the broadcast network that is adjacent to the DR of the broadcast network responsive to establishing bidirectional IGP communication with a neighbor network element member of the broadcast network according to one embodiment of the invention.

FIG. 6B is a flow diagram illustrating exemplary operations performed on a network element member of the broadcast network that is adjacent to the DR of the broadcast network responsive to establishing bidirectional IGP communication with a neighbor network element member of the broadcast network according to one embodiment of the invention. The operations of FIG. 6B will be described with reference to the exemplary embodiments of FIGS. 1 and 2. However, it should be understood that the operations of FIG. 6B can be performed by embodiments of the invention other than those discussed with reference to FIGS. 1 and 2, and the embodiments discussed with reference to FIGS. 1 and 2 can perform operations different than those discussed with reference to FIG. 6B.

As illustrated in FIG. 6B, the network element 130 performs the operations 640. However, it should be understood that other network elements in the network 100 perform similar operations (e.g., the network element 150). At block 645, bidirectional IGP communication has been established with a neighbor (e.g., a neighbor listed in the pseudo-node LSA being advertised by the DR). Flow moves to block 650, where the IGP module of the network element 130 determines whether the neighbor is currently advertising a P2P adjacency to the network element 130 (e.g., similar to operation of block 620). If the neighbor is not advertising a P2P adjacency, then flow moves to block 665 where LSA receipt processing continues. However, if the neighbor is advertising a P2P adjacency, then flow moves to block 655.

At block 655, the IGP module of the network element 130 adds a high cost P2P adjacency to that neighbor in its LSA to discourage use of that link for transit traffic. Flow then moves to block 660 where the LSA is advertised (e.g., flooded). Flow then moves to block 655.

Figure 6C:
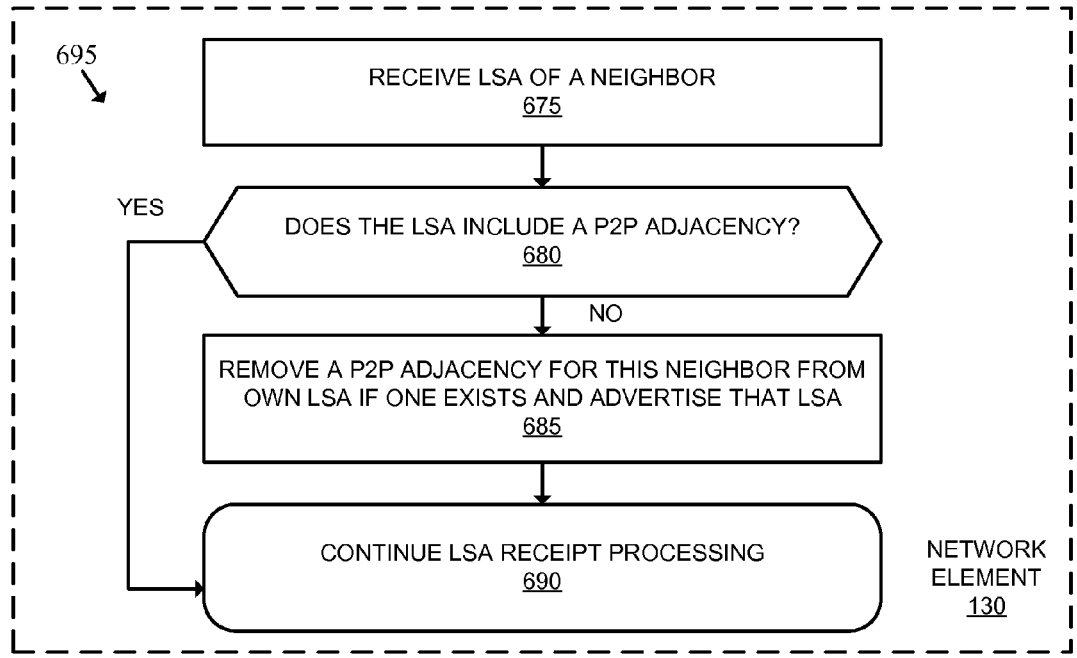
FIG. 6C is a flow diagram illustrating exemplary operations performed on a network element member of the broadcast network that is adjacent to the DR of the broadcast network responsive to receiving an LSA of a neighbor network element of the broadcast network according to one embodiment of the invention.

FIG. 6C is a flow diagram illustrating exemplary operations performed on a network element member of the broadcast network that is adjacent to the DR of the broadcast network responsive to receiving an LSA of a neighbor network element of the broadcast network according to one embodiment of the invention. The operations of FIG. 6C will be described with reference to the exemplary embodiments of FIGS. 1 and 2. However, it should be understood that the operations of FIG. 6C can be performed by embodiments of the invention other than those discussed with reference to FIGS. 1 and 2, and the embodiments discussed with reference to FIGS. 1 and 2 can perform operations different than those discussed with reference to FIG. 6C.

As illustrated in FIG. 6C, the network element 130 performs the operations 695. However, it should be understood that other network elements in the network 100 perform similar operations (e.g., the network element 150). At block 675, the IGP module of the network element 130 receives an LSA from a neighbor (e.g., the network element 140). As described above with reference to FIG. 4, the high cost P2P adjacency advertised by the network element 140 serves as an indication LDP is not operational on the broadcast interface 142 (and thus transit traffic should be avoided being transmitted towards the broadcast interface 142). Therefore, at block 680, the IGP module determines whether the LSA includes a high cost P2P adjacency. If the LSA includes a P2P adjacency, then flow moves to block 690 where LSA receipt processing continues. However, if the LSA does not include a P2P adjacency, then flow moves to block 685.

As described above, receiving an LSA from the network element 140 that does not include a P2P adjacency serves as an indication that LDP is operational on the broadcast interface 142 and that transit traffic may be sent toward the network element 140 (or at least considered by a SPF algorithm with its normal cost). Therefore, at block 685, the IGP module of the network element 130 removes the P2P adjacency to the network element 140 from its LSA if one exists, which removes the discouragement of transmitting transit traffic to that network element. With reference to FIG. 2, the network elements 130 and 140 have stopped advertising the P2P adjacencies 194 thereby removing the discouragement of the use of the bidirectional link between the network elements 130 and 140 for transmission of transit traffic. Flow moves from block 685 to block 690 where the IGP module continues with LSA receipt processing.

Thus unlike the RFC 5443 as applied to broadcast networks, the LDP-IGP synchronization mechanism described herein does not lead to transit traffic being black-holed or transit traffic from being diverted to sub-optimal paths as it is a zero-traffic-loss procedure. Therefore carrier class reliability metrics, which can easily be violated in a network that applies the RFC 5443 to broadcast networks when a link comes up, are sustained using the LDP-IGP synchronization mechanism described herein.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A network element for use in a broadcast network that depends on the establishment of Label Switched Paths (LSPs) by a label distribution protocol (LDP) that is tied to Internet Protocol (IP) forwarding decisions of an interior gateway protocol (IGP), wherein the network element is adapted to assist in avoiding black-holing of traffic and sub-optimal traffic diversion caused by IGP converging prior to LDP converging, the network element comprising:
   a broadcast network interface adapted to carry transit traffic through an LSP when LDP is operational;
   an LDP module to exchange label bindings with each neighbor of the network element; and
   an IGP module coupled to the LDP module, wherein the IGP module, responsive to bringing up an IGP adjacency with a Designated Router (DR) of the broadcast network, is operative to:
      advertise a peer-to-peer (P2P) adjacency for the broadcast network interface to each member of the broadcast network that is in a state of bidirectional IGP communication with the network element in a Link State Advertisement (LSA) of the network element instead of advertising a pseudo-node adjacency for the broadcast network interface to a pseudo-node of the broadcast network in that LSA, wherein the P2P adjacency includes a high cost to discourage use of the broadcast network interface for transit traffic, wherein the pseudo-node represents the topology of the broadcast network, and wherein the pseudo-node adjacency represents the unidirectional link from the network element to the pseudo-node; and,
      advertise, after LDP becomes operational with all neighbors on the broadcast network interface, the pseudo-node adjacency for the broadcast network interface to the pseudo-node in its LSA instead of advertising the P2P adjacencies, thereby removing the discouragement of the use of the broadcast network interface for transit traffic, whereby transit traffic is avoided on the broadcast network interface until LDP is operational with all neighbors on the broadcast network interface.

2. The network element of claim 1, wherein the IGP module is further operative to estimate whether LDP is operational with all neighbors based on an LDP-IGP synchronization timer, wherein the IGP module assumes that LDP is operational upon the LDP-IGP synchronization timer expiring.

3. The network element of claim 1, wherein the IGP module is further operative to determine that LDP is operational with each neighbor after receipt of a label advertisement completion signal from each of the neighbors on the broadcast network interface.

4. The network element of claim 1, wherein the IGP module is further operative to, for each of the members of the broadcast network that is advertised a P2P adjacency, receive a P2P adjacency with a high cost in an LSA from that member.

5. The network element of claim 1, further comprising a link state database (LSDB) to store LSAs, wherein the IGP module is further operative to avoid inclusion of the pseudo-node adjacency in the LSA and LSDB while LDP is not operational.

6. A network element for use in a broadcast network that acts as a Designated Router (DR) for the broadcast network that depends on the establishment of Label Switched Paths (LSPs) by a label distribution protocol (LDP) that is tied to Internet Protocol (IP) forwarding decisions of an interior gateway protocol (IGP), the network element comprising:
   a broadcast network interface adapted to carry transit traffic through an LSP; and
   an IGP module that is operative to:
      advertise pseudo-node Link State Advertisements (LSAs) on the broadcast network interface on behalf of a pseudo-node of the broadcast network to members of the broadcast network, wherein the pseudo-node represents the topology of the broadcast network, and wherein each pseudo-node LSA includes an indication of each member of the broadcast network that is adjacent to the DR;
      advertise high cost P2P adjacencies to the members of the broadcast network on the broadcast network interface as they are becoming adjacent to the DR, wherein each P2P adjacency represents a unidirectional link between the DR and a member of the broadcast network, wherein the P2P adjacencies are advertised to discourage transmitting transit traffic to those members on the unidirectional links represented by the P2P adjacencies; and
      cease the advertisement of the P2P adjacencies to those members of the broadcast network that have themselves advertised an LSA to the DR that does not include a P2P adjacency and became adjacent to the DR, whereby transit traffic is avoided on a unidirectional link to a member of the broadcast network until the DR receives an LSA from that member that does not include a P2P adjacency.

7. The network element of claim 6, wherein the value of the high cost designates those unidirectional links as last resort unidirectional links.

8. A network element for use in a broadcast network that is adjacent to a Designated Router (DR) of the broadcast network and has a bidirectional link to a pseudo-node of the broadcast network, wherein the broadcast network depends on the establishment of Label Switched Paths (LSPs) by a label distribution protocol (LDP) that is tied to Internet Protocol (IP) forwarding decisions of an interior gateway protocol (IGP) to function correctly, the network element comprising:
   a broadcast network interface adapted to carry transit traffic through an LSP; and
   an IGP module that is operative to:
      receive link state advertisements (LSAs) from members of the broadcast network including pseudo-node LSAs from the DR that each include an indication of each member of the broadcast network that is adjacent to the DR;
      advertise a high cost peer-to-peer (P2P) adjacency to each of those of the members of the broadcast network that are currently themselves advertising a P2P adjacency, wherein each P2P adjacency represents a unidirectional link between the network element and a member of the broadcast network, and wherein the P2P adjacencies are advertised to discourage transmitting transit traffic to those members on the unidirectional links represented by the P2P adjacencies; and
      cease the advertisement of those P2P adjacencies to each of those members upon receipt of an LSA from that member that does not include a P2P adjacency.

9. The network element of claim 8, wherein the value of the high cost designates those unidirectional links as last resort unidirectional links.

10. A method to assist in avoiding black-holing of traffic and sub-optimal traffic diversion in a broadcast network due to interior gateway protocol (IGP) converging prior to label distribution protocol (LDP) converging, wherein the broadcast network depends on the establishment of Label Switched Paths (LSPs) by LDP that is tied to Internet Protocol (IP) forwarding decisions of IGP, wherein the method is performed by a network element that is bringing up an adjacency with a Designated Router (DR) of the broadcast network, the method comprising the steps of:
  receiving a pseudo-node link state advertisement (LSA) at a broadcast network interface of the network element from the DR responsive to an establishment of bidirectional IGP communication with the DR, wherein the pseudo-node LSA includes an indication of the network element members of the broadcast network;
  for each of the network element members of the broadcast network that has bidirectional IGP communication with the network element, performing the following step:
    advertising a peer-to-peer (P2P) adjacency to that network element member in its LSA for the broadcast network interface instead of advertising an adjacency to a pseudo-node of the broadcast network in its LSA, wherein the P2P adjacency includes a high cost to discourage use of the broadcast network interface for transit traffic, wherein the pseudo-node represents the topology of the broadcast network, and wherein the adjacency to the pseudo-node represents the link between the pseudo-node and the network element; and
  responsive to LDP becoming operational with neighbors on the broadcast network interface of the network element, performing the following step:
    advertising the adjacency to the pseudo-node in its LSA for the broadcast network interface instead of the P2P adjacencies thereby removing the discouragement of the use of the broadcast network interface for transit traffic, whereby transit traffic is avoided on the broadcast network interface while LDP is not operational with the neighbors on the broadcast network interface.

11. The method of claim 10, further comprising the step of estimating that LDP is operational based on an LDP-IGP synchronization timer expiring.

12. The method of claim 10, further comprising the step of determining that LDP is operational after receiving from each of the neighbors of the network element a message which indicates completion of its label advertisements following session establishment.

13. The method of claim 10, further comprising the step of:
  receiving a P2P adjacency with a high cost in an LSA from each of the network element members that is advertised a P2P adjacency.

14. The method of claim 10, further comprising the step of avoiding including the adjacency to the pseudo-node in an LSA and in a link state database (LSDB) of the network element until LDP is operational.

15. A broadcast network that depends on the establishment of Label Switched Paths (LSPs) by a label distribution protocol (LDP) that is tied to Internet Protocol (IP) forwarding decisions of an interior gateway protocol (IGP), wherein the broadcast network is adapted to avoid black-holing of traffic and sub-optimal traffic diversion caused by IGP converging prior to LDP converging, the broadcast network comprising:
  a plurality of network elements each including:
    a broadcast network interface;
    an LDP module that exchanges label bindings with members of the broadcast network on the broadcast network interface; and
    an IGP module that performs the following:
      substitutes, while LDP is not operational with each neighbor on the broadcast network interface, advertising a pseudo-node adjacency in its link state advertisement (LSA) with peer-to-peer (P2P) adjacencies having a high cost to members of the broadcast network that have bidirectional IGP communication with the network element to discourage use of the broadcast network interface for transit traffic;
      replaces, responsive to LDP becoming operational with each neighbor on the broadcast network interface, the P2P adjacencies in its LSA with the pseudo-node adjacency thereby removing the discouragement of the use of the broadcast network interface for transit traffic; and
      advertises a high cost P2P adjacency to those of the network element members that have bidirectional IGP communication with the network element and are themselves advertising a P2P adjacency with a high cost to avoid those links to those network element members in forwarding decisions.

16. The broadcast network of claim 15, wherein the IGP module of each network element further elects one of the plurality of network elements to be a Designated Router (DR) of the broadcast network, wherein the IGP module on the DR also performs the following:
  advertises pseudo-node LSAs to the other network element members of the broadcast network on behalf of a pseudo-node of the broadcast network, wherein the pseudo-node represents the topology of the broadcast network, and wherein each pseudo-node LSA includes an indication of each of the network element members of the broadcast network that is currently adjacent to the pseudo-node;
  advertises high cost P2P adjacencies to the other network element members of the broadcast network on the broadcast network interface as they become adjacent to the DR, wherein each P2P adjacency represents a unidirectional link between the DR and a member of the broadcast network, wherein the P2P adjacencies are advertised to discourage transit traffic on the unidirectional links represented by the P2P adjacencies;
  ceases advertising P2P adjacencies to those members of the broadcast network that have themselves advertised an LSA to the DR that does not include a P2P adjacency.

17. The broadcast network of claim 16, wherein each network element further includes a link state database (LSDB) that stores LSAs for the broadcast network.

18. The broadcast network of claim 16, wherein the IGP modules of the network elements estimate that LDP is operational with members of the broadcast network through an expiration of an LDP-IGP synchronization timer.

19. The broadcast network of claim 16, wherein the LDP module of each network element signals completion of label advertisements following session establishment, and wherein the IGP modules of the network elements determine that LDP is operational with network element members upon receipt of a completion signal from each of those network element members.

20. The broadcast network of claim 16, wherein the value of the high cost designates the corresponding links as last resort links.

* * * * *

UNITED STATES PATENT AND TRADEMARK OFFICE
CERTIFICATE OF CORRECTION

PATENT NO.          : 8,477,795 B2                                      Page 1 of 1
APPLICATION NO.     : 12/546433
DATED               : July 2, 2013
INVENTOR(S)         : Kini et al.

It is certified that error appears in the above-identified patent and that said Letters Patent is hereby corrected as shown below:

On Title Page 2, item (56), under "OTHER PUBLICATIONS" in Column 1, Line 1, delete "mulitcast" and insert -- multicast --, therefor.

In the Specification

In Column 1, Line 25, delete "converges As" and insert -- converges. As --, therefor.

In Column 5, Line 65, delete "Over Internet" and insert -- over Internet --, therefor.

Signed and Sealed this
Fifth Day of November, 2013

Teresa Stanek Rea
*Deputy Director of the United States Patent and Trademark Office*